US009098122B2

(12) United States Patent
Weinberg et al.

(10) Patent No.: US 9,098,122 B2
(45) Date of Patent: Aug. 4, 2015

(54) COMPUTER INPUT DEVICE WITH INERTIAL INSTRUMENTS

(75) Inventors: Marc S. Weinberg, Needham, MA (US); Robert A. Larsen, Somerville, MA (US); Scott A. Rasmussen, Framingham, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 1637 days.

(21) Appl. No.: 11/955,244

(22) Filed: Dec. 12, 2007

(65) Prior Publication Data

US 2009/0153482 A1    Jun. 18, 2009

(51) Int. Cl.
*G06F 3/033* (2013.01)
*G09G 5/08* (2006.01)
*G06F 3/03* (2006.01)
*G06F 3/0354* (2013.01)

(52) U.S. Cl.
CPC .............. *G06F 3/03* (2013.01); *G06F 3/03543* (2013.01)

(58) Field of Classification Search
USPC .................................................. 345/156, 163
See application file for complete search history.

(56) References Cited

U.S. PATENT DOCUMENTS

| 4,787,051 A | 11/1988 | Olson |
| 5,692,815 A * | 12/1997 | Murphy ........................ 312/283 |
| 5,825,350 A * | 10/1998 | Case et al. ..................... 345/163 |
| 5,898,421 A | 4/1999 | Quinn |
| 6,191,774 B1 | 2/2001 | Schena et al. |
| 6,252,579 B1 | 6/2001 | Rosenberg et al. |
| 6,445,364 B2 | 9/2002 | Zwern |
| 6,954,198 B2 | 10/2005 | Shih et al. |
| 7,081,884 B2 | 7/2006 | Kong |
| 7,106,313 B2 | 9/2006 | Schena et al. |
| 7,131,073 B2 | 10/2006 | Rosenberg et al. |
| 7,154,477 B1 | 12/2006 | Hotelling et al. |
| 7,158,118 B2 * | 1/2007 | Liberty ......................... 345/158 |
| 7,680,749 B1 * | 3/2010 | Golding et al. ................ 706/14 |
| 7,830,360 B2 * | 11/2010 | Jeng et al. ..................... 345/156 |
| 2002/0158827 A1 | 10/2002 | Zimmerman |
| 2003/0107551 A1 * | 6/2003 | Dunker ......................... 345/158 |
| 2006/0033716 A1 | 2/2006 | Rosenberg et al. |
| 2006/0164393 A1 | 7/2006 | Wu et al. |
| 2006/0256085 A1 | 11/2006 | Tsai et al. |
| 2007/0132733 A1 | 6/2007 | Ram |
| 2007/0146325 A1 | 6/2007 | Poston et al. |
| 2007/0205985 A1 | 9/2007 | Trzecieski |
| 2007/0216648 A1 | 9/2007 | Lo et al. |

FOREIGN PATENT DOCUMENTS

| DE | 10258952 A1 | 8/2004 |
| DE | 202005013050 U1 | 11/2005 |
| DE | 102004057960 A1 | 6/2006 |
| EP | 1717669 A1 | 11/2006 |
| JP | 03-192423 | 8/1991 |

* cited by examiner

*Primary Examiner* — Seokyun Moon

(74) *Attorney, Agent, or Firm* — Lando & Anastasi LLP

(57) ABSTRACT

A computer input device includes, in one embodiment, at least two accelerometers, at least two gyroscopes, and a processor within a housing. Signals from the accelerometers and the gyroscopes are utilized to determine the relative motion of the computer input device.

26 Claims, 2 Drawing Sheets

COMPUTER INPUT DEVICE WITH INERTIAL INSTRUMENTS

FIELD OF THE INVENTION

This invention relates generally to computer input devices, and in particular to computer input devices incorporating inertial instruments.

BACKGROUND

The importance of highly functional input devices for computing devices such as computers has grown in concert with the rise in functionality and speed of the computing devices themselves. One popular computer input device is the mouse. User-directed motion of a mouse is translated into motion of a cursor or other pointer on the computer display, and buttons, wheels, etc. on the mouse are utilized to, for example, select various images on the display. Conventional mechanical mice (or mouses) incorporate a roller ball. Sensors within the mouse detect the motion of the ball as the mouse is manipulated. However, the moving parts of mechanical mice frequently become contaminated with dust or other particulates, deleteriously impacting mouse performance.

One way to overcome the shortcomings of mechanical mice is to use optical sensors within the mouse to detect its motion. A mouse incorporating optical sensors, frequently termed an "optical mouse," includes a light source, such as a laser or light-emitting diode, and a photosensor. Light from the light source is transmitted toward and reflects off of a surface as the mouse is moved thereover and the photosensor detects the reflected light many times a second. Movement of the mouse is determined based on slight changes in the images created by the reflected light.

While optical mice have compensated for many of the shortcomings of mechanical mice, they have deficiencies of their own. In particular, the motion of an optical mouse over optically specular, transparent, or highly reflective surfaces is difficult to determine with a high degree of accuracy. Moreover, the light source requires a relatively large amount of power, which may compromise the lifetime of battery-powered wireless mice.

SUMMARY

The foregoing limitations of conventional computer mice are herein addressed by using inertial sensors within a computer mouse to detect movement thereof. The computer mouse incorporating the inertial sensors demonstrates improved performance on surfaces unsuitable for optical mice operation.

In accordance with embodiments of the invention, a computer input device incorporates at least two accelerometers and at least two gyroscopes in a housing. Advantages of this approach include operability of the computer input device on specular or transparent surfaces, as well as improved accuracy, as gyroscope signals correct for any component of gravity detected by the nominally horizontal accelerometers.

In some embodiments, in order to combine the signals from the inertial sensors, a digital filter, for example a Kalman filter, is utilized. Furthermore, an optical sensor package may be incorporated into the computer input device to provide an alternative or complementary positioning system.

In one aspect, embodiments of the invention feature a computer input device having a housing for movement over a substantially two-dimensional surface, a sensor unit including at least two accelerometers and at least two gyroscopes within the housing, and a processor for determining relative motion of the computer input device utilizing signals from the accelerometers and the gyroscopes. In an embodiment, the signals from the gyroscopes are utilized to correct for non-uniformity and/or tilt in the substantially two-dimensional surface as the computer input device is moved thereover. An optical sensor for sensing relative motion of the computer input device may also be provided within the computer input device.

The computer input device may include a digital filter, for example a Kalman filter, for combining the signals from the accelerometers and the gyroscopes. Wireless or wired means for transmitting, to a computing device, data indicative of the relative motion of the computer input device may also be included. The housing may include at least one user-operable button, and the computer input device may include means for transmitting, to a computing device, data indicative of the button's operation. The data indicative of the button's operation may be utilized at least in part to indicate that the computer input device is substantially motionless.

In another aspect, embodiments of the invention feature a method of fabricating a computer input device. The method includes providing a housing, and disposing, within the housing: (i) a sensor unit including at least two accelerometers and at least two gyroscopes, and (ii) circuitry, responsive to the sensor unit, for determining movement of the housing over a substantially two-dimensional surface. In an embodiment, an optical sensor for sensing relative motion of the computer input device is provided within the housing. Means for transmitting, to a computing device, the relative motion of the computer input device may also be provided within the housing. In a further embodiment, a digital filter, for example a Kalman filter, for combining the signals from the accelerometers and the gyroscopes may be encoded into the circuitry.

In yet another aspect, embodiments of the invention feature a method of determining relative motion of a computer input device. The method includes providing at least two accelerometers, at least two gyroscopes, and a processor within a housing for movement over a substantially two-dimensional surface. The housing is moved over the substantially two-dimensional surface, and the relative motion of the housing is calculated utilizing signals from the accelerometers and the gyroscopes generated in response to the motion of the housing. The signals from the gyroscopes are utilized to correct for non-uniformity and/or tilt in the substantially two-dimensional surface.

Calculating the relative motion may include combining the signals generated by the accelerometers and the gyroscopes using, for example, a Kalman filter. The relative motion of the housing may also be transmitted to a computing device. The substantially two-dimensional surface may be non-uniform and/or tilted.

In another aspect, embodiments of the invention feature a computer input device including a housing for movement over a substantially two-dimensional surface. Within the housing are (i) means for sensing motion of the computer input device, (ii) means for correcting for non-uniformity and/or tilt of the substantially two-dimensional surface, and (iii) means for calculating relative motion of the computer input device utilizing signals from the means for sensing motion and the means for correcting.

In yet another aspect, embodiments of the invention feature a computing device including a processor, a display electrically connected and responsive to the processor, and a computer input device in communication with the processor. The computer input device includes a housing for movement over a substantially two-dimensional surface, a sensor unit, disposed within the housing, that includes at least two accelerometers and at least two gyroscopes, and circuitry for determining relative motion of the computer input device utilizing signals from the accelerometers and the gyroscopes.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
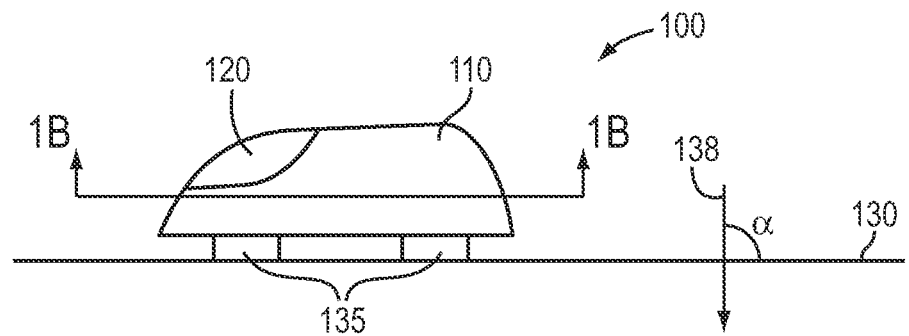
FIG. 1A is a schematic side view of a computer input device in accordance with one embodiment of the invention.

Referring to FIG. 1A, a computer input device 100 includes a housing 110 and at least one user-operable button 120 thereon. The housing 100 may include, or consist essentially of, a rigid material, such as a plastic, and may be sized and shaped for movement (via human user manipulation) over a substantially two-dimensional surface 130. More specifically, when the computer input device 100 is moved over the surface 130, at least a portion of a bottom side of the housing 110 remains in contact with the surface 130. This portion may take the form of a plurality of pads 135, which facilitate the movement of and/or reduce friction between the housing 100 and the surface 130. The pads 135 may be integral portions of the housing 110 or may be formed of a different material. In an embodiment, two or more user-operable buttons 120 are included on the housing 100.

The surface 130 is substantially two-dimensional and is generally rigid. The surface 130 may be substantially optically featureless, specular, and/or transparent. In some circumstances, the surface 130 is tilted, i.e., lies at an angle $\alpha$ less than 90° with respect to the direction of gravity (depicted as direction 138 in FIG. 1A). The surface 130 may have microscopic non-uniformities, texture, and/or undulations such that, while the surface 130 is globally substantially two-dimensional, a computer input device 100 moving across it will experience tilt and motion in a direction normal thereto (the amount of which is small compared to the corresponding amount of motion in the plane of surface 130).

Figure 1B:
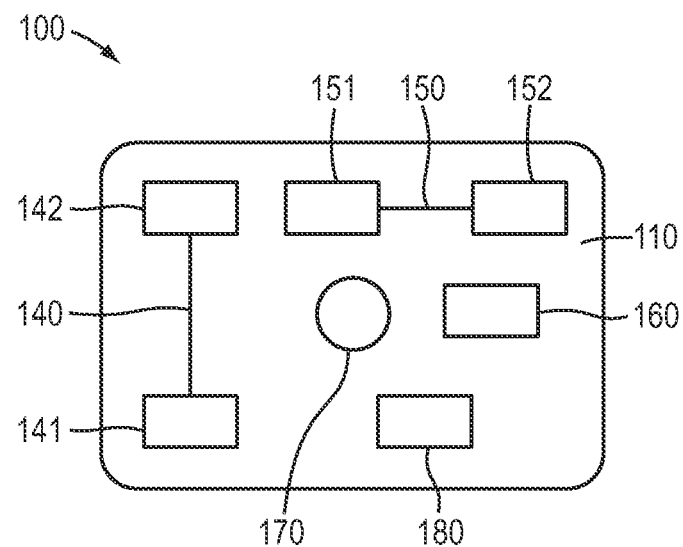
FIG. 1B is a schematic cross-sectional view of the interior of the computer input device depicted in FIG. 1A, taken along the line 1B-1B.

FIG. 1B represents a schematic cross-section of the computer input device 100 along line 1B-1B of FIG. 1A. As shown, the housing 110 contains sensors and circuitry that cooperate to translate the movement of the computer input device 100 into the motion of a cursor or other pointer on a display of a computing device (further described below). More specifically, as the motion of the computer input device 100 is substantially two-dimensional, the housing 110 contains an accelerometer-gyroscope pair 140, 150 for each of the two dimensions (termed an X axis and Y axis herein) defining the surface 130. Accelerometer-gyroscope pair 140, which tracks motion along the X axis, includes an accelerometer 141 and a gyroscope 142, while accelerometer-gyroscope pair 150, which tracks motion in the Y axis, includes an accelerometer 151 and a gyroscope 152. Circuitry 160 connects electrically to the accelerometer-gyroscope pairs 140, 150 and processes the electrical signals generated thereby. The circuitry 160 may include, or consist essentially of, a processor, such as a microprocessor or a digital signal processor.

As the computer input device 100 is moved across the surface 130, the accelerometer-gyroscope pairs 140, 150 generate signals responsive to the motion. Considering, for example, motion only along the X axis, the accelerometer 141 detects, and generates a signal representative of, the acceleration of the computer input device 100 along the X axis. The new position of the computer input device 100 along the X axis may then be calculated by double integration of the acceleration signal from the accelerometer 141. The gyroscope 142 detects when the X axis (along which accelerometer 141 detects acceleration) rotates at a slight angle from horizontal due to tilt and or non-uniformity in the surface 130. Such rotation causes the accelerometer 141 to detect acceleration due to gravity, and introduces error into the accelerometer 141 signal. That is, the signal from the accelerometer 141 represents not only motion across the plane of the substantially two-dimensional surface 130, but also acceleration due to gravity at a non-normal angle to the surface 130. The signal from the gyroscope 142 is utilized to correct the accelerometer 141 signal, i.e., remove therefrom any influence of gravity.

More specifically, the gyroscope 142 detects when the X axis rotates slightly due to tilt and/or non-uniformity, and outputs a signal signifying such rotation. The circuitry 160 utilizes the signal from the gyroscope 142 to correct the signal received from the accelerometer 141 (i.e., the circuitry 160 combines the signals from the gyroscope 142 and the accelerometer 141 by using, for example, a filter or algorithm), thus eliminating error due to the tilt and/or non-uniformity. In an embodiment, the circuitry 160 includes a filter which combines the signals from the accelerometer 141 and the gyroscope 142. The filter may include, or consist essentially of, a digital filter, such as a Kalman filter, or an analog filter. In an embodiment, the filter may include both analog and digital portions. The filter may also filter noise from the signals from the accelerometer 141 and the gyroscope 142. The filter or algorithm may be embodied in software (e.g., written in any one of a number of high-level languages, such as FORTRAN, PASCAL, C, C++, C#, Java, Tcl, or BASIC; or in a script, macro, or functionality embedded in commercially available software, such as EXCEL or VISUAL BASIC; or in an assembly language directed to a microprocessor resident on a computer), or hardware (e.g., as an application-specific integrated circuit), or as firmware embedded in a microprocessor. The functionality of the circuitry 160 is straightforwardly implemented by one of skill in the art without undue experimentation.

The accelerometer-gyroscope pair 150 operates in a similar manner, but detects motion along the Y axis, which is substantially perpendicular to the X axis. The accelerometer-gyroscope pairs 140, 150 operate in tandem with respect to the X-axis and Y-axis components of a particular motion. The circuitry 160 receives the signals from the accelerometer-gyroscope pairs 140, 150 and determines the motion (and therefore the new position) of the computer input device 100.

Signals may be output from the accelerometer-gyroscope pairs 140, 150 even when the computer input device 100 is substantially motionless. For example, signals may be output from the accelerometer-gyroscope pairs 140, 150 due to sensor drift. In order to prevent spurious results, the filter or algorithm encoded in the circuitry 160 may be tuned or coded so as to indicate a lack of movement when both the velocity (obtained by integrating the acceleration signal) and acceleration of the computer input device 100 are very small. Both velocity and acceleration should be considered. For example, if the computer input device 100 is moving at a constant velocity, the acceleration thereof will be very small; therefore, acceleration alone is an insufficient indicator. In one embodiment, the computer input device 100 is considered to be motionless when the detected velocity thereof is less than approximately 0.02 m/s and the detected acceleration thereof is less than approximately 0.1 m/s$^2$. These threshold values are approximate and can be tuned for individual sensors and operators.

In some embodiments, the button 120 is operated by a user of the computer input device 100 when the computer input device 100 is substantially motionless. Thus, the filter or algorithm may be coded to consider the computer input device 100 to be motionless when the button 120 is operated, and to be reset based on the current values of the signals from the accelerometer-gyroscope pairs 140, 150 when the button 120 is operated. In this way, the input device is normalized or calibrated to its environment.

In some embodiments, when the computer input device 100 is substantially motionless, i.e., its sensed acceleration and velocity fall below the thresholds discussed above and/or the button 120 is operated, the signals from the accelerometer-gyroscope pairs 140, 150 are read and utilized to update the filter or algorithm that converts the signals into motion. The filter or algorithm includes sensor biases which are updated at this time based on the signals from the accelerometer-gyroscope pairs 140, 150. A component of any tilt and/or non-uniformity in the surface 130 at the position of the computer input device 100 is included in the new bias for the accelerometers 141, 151, thus correcting for the tilt and/or non-uniformity while the computer input device is motionless. Once the computer input device 100 is moved again, the gyroscopes 142, 152 correct for any additional tilt and/or non-uniformity in the surface 130 as described above.

In an embodiment, the housing 110 also contains an optical sensor 170 that also detects the relative motion of the computer input device 100. Optical sensor 170 may include a light source, for example a laser or a light-emitting diode, and a detector. Light from the light source is emitted towards the surface 130 and is reflected back to the detector. The detector may compare images from the detected light (at, for example, many times per second) to determine the direction and speed of motion of the computer input device 100. In an embodiment, the optical sensor 170 is utilized in parallel with the accelerometer-gyroscope pairs 140, 150. In another embodiment, a user may select one of the optical sensor 170 and the accelerometer-gyroscope pairs 140, 150 to be operative at a given time—the other may then be powered down to decrease power consumption.

Figure 2:
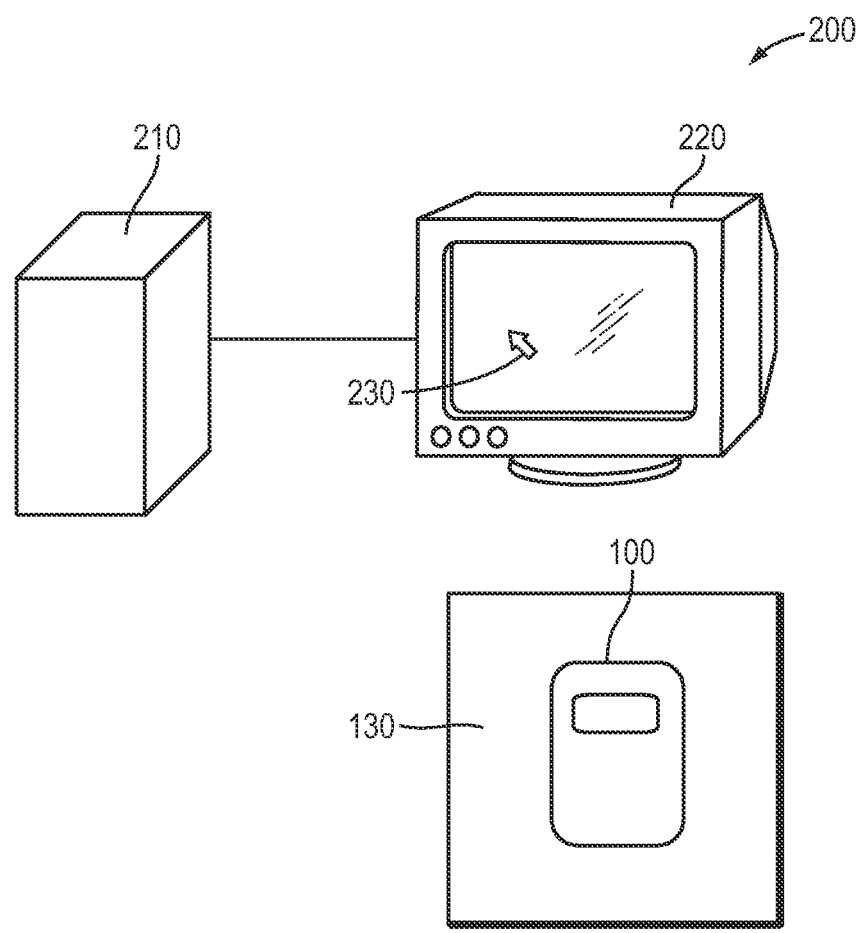
FIG. 2 is a schematic view of a computing device incorporating a computer input device in accordance with one embodiment of the invention.

Referring to FIG. 2, the computer input device 100 may be utilized as a component of a computing device 200. The computing device 200 includes a processor 210 electrically connected to a display 220. The processor 210 and the display 220 may be housed as separate units connected wirelessly or by wire, or may be housed together in the same package. The processor 210 may include, or consist essentially of, a microprocessor or other integrated circuit. In an embodiment, the processor 210 is also in electrical connection with other components generally found associated with a personal computer, for example storage media and/or input devices, such as a keyboard (not shown). The computer input device 100 may be in electrical communication with the processor 210. In an embodiment, a conductive cable (not shown) connects the computer input device 100 to the processor 210. In another embodiment, the computer input device 100 includes a transmitter module 180 (see FIG. 1B) that wirelessly transmits, for example by radio-frequency or infrared signal, signals associated with the motion of the computer input device 100 to the processor 210. The signals may be received by the processor 210 and translated into corresponding motion of a cursor 230 on the display 220.

The invention may be embodied in other specific forms without departing from the spirit or essential characteristics thereof. The foregoing embodiments are therefore to be considered in all respects as illustrative of, rather than limiting on, the invention described herein.

What is claimed is:

1. A computer input device, comprising:
    a housing for movement over a substantially two-dimensional surface;
    a sensor unit, disposed within the housing, comprising a plurality of inertial sensors, at least two of the inertial sensors being accelerometers and at least two of the inertial sensors being gyroscopes; and
    a processor for determining relative motion of the computer input device utilizing signals from the accelerometers and the gyroscopes, the signals from the gyroscopes indicating rotation of the computer input device about an axis perpendicular to the direction of gravity due to non-uniformity or tilt of the substantially two-dimensional surface as the computer input device is moved thereover, and the signals from the accelerometers indicating acceleration of the computer input device;
    wherein the processor is configured to utilize the signals from the gyroscopes to correct the signals from the accelerometers for acceleration error introduced by gravity due to the non-uniformity or tilt of the substantially two-dimensional surface as the computer input device is moved thereover.

2. The computer input device of claim 1, further comprising an optical sensor for sensing relative motion of the computer input device.

3. The computer input device of claim 1, further comprising a digital filter for combining the signals from the accelerometers and the gyroscopes.

4. The computer input device of claim 3, wherein the digital filter comprises a Kalman filter.

5. The computer input device of claim 1, further comprising means for transmitting, to a computing device, data indicative of the relative motion of the computer input device.

6. The computer input device of claim 1, further comprising:
    at least one user-operable button disposed on the housing; and
    means for transmitting, to a computing device, data indicative of the button's operation.

7. The computer input device of claim 6, wherein the data indicative of the button's operation is utilized at least in part to indicate that the computer input d is substantially motionless.

8. A method of fabricating a computer input device, the method comprising:
    providing a housing; and
    disposing, within the housing, (i) a sensor unit comprising a plurality of inertial sensors, at least two of the inertial sensors being accelerometers and at least two of the inertial sensors being gyroscopes, and (ii) circuitry, responsive to the sensor unit, for determining movement of the housing over a substantially two-dimensional surface by, at least in part, utilizing signals from the accelerometers and gyroscopes, the signals from the accelerometers indicating acceleration of the housing and the signals from the gyroscopes indicating rotation of the housing about an axis perpendicular to the direction of gravity due to non-uniformity or tilt of the substantially two-dimensional surface as the housing is moved thereover, and correcting, based on the signals from the gyroscopes, the signals from the accelerometers for acceleration error introduced by gravity due to the non-uniformity or tilt of the substantially two-dimensional surface as the housing is moved thereover.

9. The method of claim 8, further comprising providing within the housing an optical sensor for sensing relative motion of the computer input device.

10. The method of claim 8, further comprising providing within the housing means for transmitting, to a computing device, data indicative of the movement of the housing.

11. The method of claim 8, further comprising encoding into the circuitry a digital filter to combine signals from the accelerometers and the gyroscopes.

12. The method of claim 11, wherein the digital filter comprises a Kalman filter.

13. A method of determining relative motion of a computer input device, the method comprising:
moving a housing over a substantially two-dimensional surface, the housing comprising a plurality of inertial sensors and a processor, at least two of the inertial sensors being accelerometers and at least two of the inertial sensors being gyroscopes;
calculating the relative motion of the housing utilizing signals from the accelerometers and the gyroscopes generated in response to the motion of the housing, the signals from the gyroscopes indicating rotation of the housing about an axis perpendicular to the direction of gravity due to movement of the housing over the substantially two-dimensional surface and the signals from the accelerometers indicating acceleration of the housing; and
correcting, based on the signals from the gyroscopes, the signals from the accelerometers for acceleration error introduced by gravity due to non-uniformity or tilt of the substantially two-dimensional surface as the housing is moved thereover.

14. The method of claim 13, wherein the substantially two dimensional surface is non-uniform.

15. The method of claim 13, wherein the substantially two dimensional surface is tilted.

16. The method of claim 13, wherein calculating the relative motion comprises combining the signals generated by the accelerometers and the gyroscopes.

17. The method of claim 16, wherein the combining comprises utilizing a Kalman filter.

18. The method of claim 13, further comprising transmitting the relative motion of the housing to a computing device.

19. A computer input device, con sing:
a housing for movement over a substantially two-dimensional surface;
means, disposed within the housing, for sensing acceleration of the computer input device;
means, disposed within the housing, for sensing angular motion with regard to an axis perpendicular to the direction of gravity due to at least one of non-uniformity or tilt of the substantially two-dimensional surface as the housing is moved thereover;
means for correcting for an acceleration error introduced by gravity due to the non-uniformity or tilt of the substantially two-dimensional surface as the housing is moved thereover; and
means, disposed within the housing, for calculating relative motion of the computer input device utilizing signals from (i) the means for sensing acceleration, (ii) the means for sensing angular motion, and (iii) the means for correcting.

20. A computing device, comprising:
a processor;
a display electrically connected and responsive to the processor; and
a computer input device in communication with the processor, comprising:
a housing for movement over a substantially two-dimensional surface,
a sensor unit, disposed within the housing, comprising a plurality of inertial sensors, at least two of the inertial sensors being accelerometers and at least two of the inertial sensors being gyroscopes, and
circuitry for determining relative motion of the computer input device utilizing signals from the accelerometers and the gyroscopes, the signals from the gyroscopes indicating rotation of the computer input device about an axis perpendicular to the direction of gravity due to non-uniformity or tilt of the substantially two-dimensional surface as the computer input device is moved thereover and the signals from the accelerometers indicating acceleration of the computer input device,
wherein the circuitry is configured to utilize the signals from the gyroscopes to correct the signals from the accelerometers for an acceleration error introduced by gravity due to the non-uniformity or tilt of the substantially two-dimensional surface as the computer input device is moved thereover.

21. The computer input device of claim 1, further comprising:
circuitry for calibrating at least one of the inertial sensors by updating a bias of the inertial sensor based on a signal value received directly therefrom when the computer input device is determined to be motionless.

22. The computer input device of claim 21, wherein the computer input device is determined to be motionless when either (a) a velocity of the computer input device is below a velocity threshold and an acceleration of the computer input device is below an acceleration threshold or (b) a user-operable button disposed on the computer input device is depressed.

23. The computer input device of claim 21, wherein the updated bias comprises a component of at least one of the non-uniformity or tilt of the substantially two dimensional surface.

24. The method of claim 13, further comprising:
calibrating at least one of the inertial sensors by updating a bias of the inertial sensor based on a signal value received directly therefrom when the housing is determined to be motionless.

25. The method of claim 24, wherein the housing is determined to be motionless when either (a) a velocity of the housing is below a velocity threshold and an acceleration of the housing is below an acceleration threshold or (b) a user-operable button disposed on the housing is depressed.

26. The method of claim 24, wherein the updated bias comprises a component of at least one of the non-uniformity or tilt of the substantially two-dimensional surface.

\* \* \* \* \*